United States Patent [19]

Lemelson

[11] Patent Number: 4,632,654
[45] Date of Patent: Dec. 30, 1986

[54] ROTATIONAL MOLDING APPARATUS

[76] Inventor: Jerome H. Lemelson, 48 Parkside Dr., Princeton, N.J. 08540

[21] Appl. No.: 513,433

[22] Filed: Jul. 13, 1983

[51] Int. Cl.⁴ .............................................. B29C 5/04
[52] U.S. Cl. .................................... 425/150; 264/310; 425/183; 425/429; 425/430; 425/434; 425/435
[58] Field of Search ............... 425/183, 429, 430, 434, 425/150, 435

[56] References Cited

U.S. PATENT DOCUMENTS

| | | | |
|---|---|---|---|
| 2,027,165 | 1/1936 | Grubman . | |
| 2,347,717 | 5/1944 | Staege . | |
| 3,507,950 | 4/1970 | Barnett et al. | 264/310 |
| 3,822,980 | 7/1974 | Graeper | 425/425 |
| 3,875,273 | 4/1975 | Martin | 264/43 |
| 3,907,482 | 9/1975 | Shiota et al. | 425/435 |
| 3,942,618 | 3/1976 | Franklin | 425/62 |
| 4,043,721 | 8/1977 | Lemelson | 425/116 |
| 4,247,279 | 1/1981 | Masters | 425/430 |

Primary Examiner—James Derrington

[57] ABSTRACT

Rotational molding apparatus and methods for rotationally molding castable material such as polymers and other materials. In one form, a shuttle or wheeled carriage containing a mold fixture for holding one or more molds, which fixture is both pivotable and rotatable on the carriage, is operable to move along a fixed path into and out of an oven and a cooling chamber. Two of such mold fixture containing carriages may be automatically moved between the oven and one or more cooling chambers, alternately to permit the oven and cooling chamber or chambers to be operated substantially all of the time during an operating shift. An automatic programming device or computer operates to control the movement of the carriage or carriages into and out of the oven and cooling chamber, the operations of the fixture rotating and pivoting motors and, if utilized, the operation of automatic mold charging equipment, the cooling chamber water pumps, the oven heating elements, mold opening and closing means, molded article removal equipment, etc. In a particular form, mold containing carriages alternately move into the oven and cooling chamber along a single track wherein one carriage is either sidetracked or moved to the side of the single track while the other carriage travels between the oven and cooling chamber.

15 Claims, 7 Drawing Figures

FIG. 1.

ROTATIONAL MOLDING APPARATUS

SUMMARY OF THE INVENTION

This invention relates to an apparatus and method for molding, particularly in a mold or molds which are rotated about an axis which is automatically varied in attitude with respect to the horizontal. Such molding systems have been generally classified as rotational molding or casting systems and have been used to produce a variety of hollow objects, generally small object such as balls, toys, containers and the like. The apparatus of the instant invention generally is supported by a plurality of carriages which alternately feed into a heating chamber of furnace in such a manner that the heat of the furnace is not wasted and the furnace is in use most of the time for heating one or more molds to set and/or melt plastic materials disposed therein. In a preferred form, two mold containing carriages are disposed for travel along the same track which passes through cooling chambers located at opposite ends of a central oven wherein the power or motor means employed to rotate the mold or molds and to pivot same on each carriage is disposed adjacent and preferably outside the oven and operates to couple to the mold moving apparatus when the mold or carriage holding same is predeterminately aligned within the oven. If plastic material or materials are to be injected into the mold or molding therein while in the oven, suitable injection equipment is provided outside of the oven and contains one or more nozzles which couple to the mold or its mount by moving through a wall or walls of the oven to coupling inlet means on the mold or supported by the carriage. The entire apparatus including the two mold carriages, the mold driving means, injection means and auxilliary equipment is automatically controlled by a computer or microprocessor to optimize the operation an minimize down time.

Rotational molding systems of the prior art are exemplified by such as U.S. Pat. Nos. 3,875,273 and 4,043,721 which relate to compostie rotational molding equipment on a stationery base; U.S. Pat. No. 3,822,980 relating to a mold carrying frame movable along a track into an oven; U.S. Pat. No. 3,882,792 relating to a pallet car conveyor for molds; U.S. Pat. No. 3,942,618 relating to a roller apparatus for handling molds; U.S. Pat. No. 2,027,165 relating to a conveyorized rotational molding system for dolls; U.S. Pat. No. 2,347,717 relating to a conveyorized rubber molding system U.S. Pat. No. 3,189,971 relating to a system for casting hollow articles and U.S. Pat. No. 3,907,482 relating to a rotational molding apparatus employing a plurality of guide tracks to mold carriages. Each of these inventions suffers certain shortcomings particularly if it is desired to produce large hollow or foam filled moldings by rotational casting. Another limitation may comprise the usage of floor space which may define a substantial portion of a factory floor for the molding machinery alone, using the apparatus of the prior art.

Accordingly it is a primary object of this invention to provide a new and improved rotational molding apparatus and a method of molding large castings in molds which are moved on carriages or shuttle cars which are automatically controlled in their movements through an oven and cooling chambers.

Another object is to provide a rotational molding apparatus and method employing shuttle cars to alternately move molds thereon into and out of an oven for heating the contents of the mold or molds thereon.

Another object is to provide a rotational molding apparatus for molding large objects and the like, such as large containers and vehicle bodies, using a minimum amount of factory floor space.

Another object is to provide a rotational molding system and method employing two shuttle cars, each containing a mold or array of molds which alternately feed into an oven and into respective cooling chambers for cooling or setting the contents of the molds, wherein the operation of both cars and the rotation of the molds thereon is automatically controlled without human attendance.

Another object is to provide a shuttle car rotational molding apparatus and method in which the movements and locations of two shuttle cars containing molds is so controlled as to permit the rapid and automatic loading and unloading of the molds thereof by automatic means such as automatic manipulators.

Another object is to provide a rotational molding apparatus employing one or more carriages for supporting and moving molds into and our of a heating oven or furnace wherein drive means for power moving the molds on the carriages is supported outside of the oven and is automatically coupled to the mold when properly located in the oven, thereby avoiding subjecting motors and the like to the heat of the oven.

With the above and such other objects in view as may hereinafter more fully appear, the invention consists of the novel constructions, combinations and arrangements of parts and assemblies and methods of operation which will be hereinafter more fully described and illustrated in the accompanying drawings wherein are shown embodiments of this invention and it is to be understood that changes, variations and modifications may be resorted to which fall within the scope of the invention as claimed.

DESCRIPTION OF THE DRAWINGS

FIG. 6 is a schematic diagram of a control system for controlling operation of the molding apparatus of FIGS. 1 to 5 by means of a computer or microprocessor control system.

Figure 1:
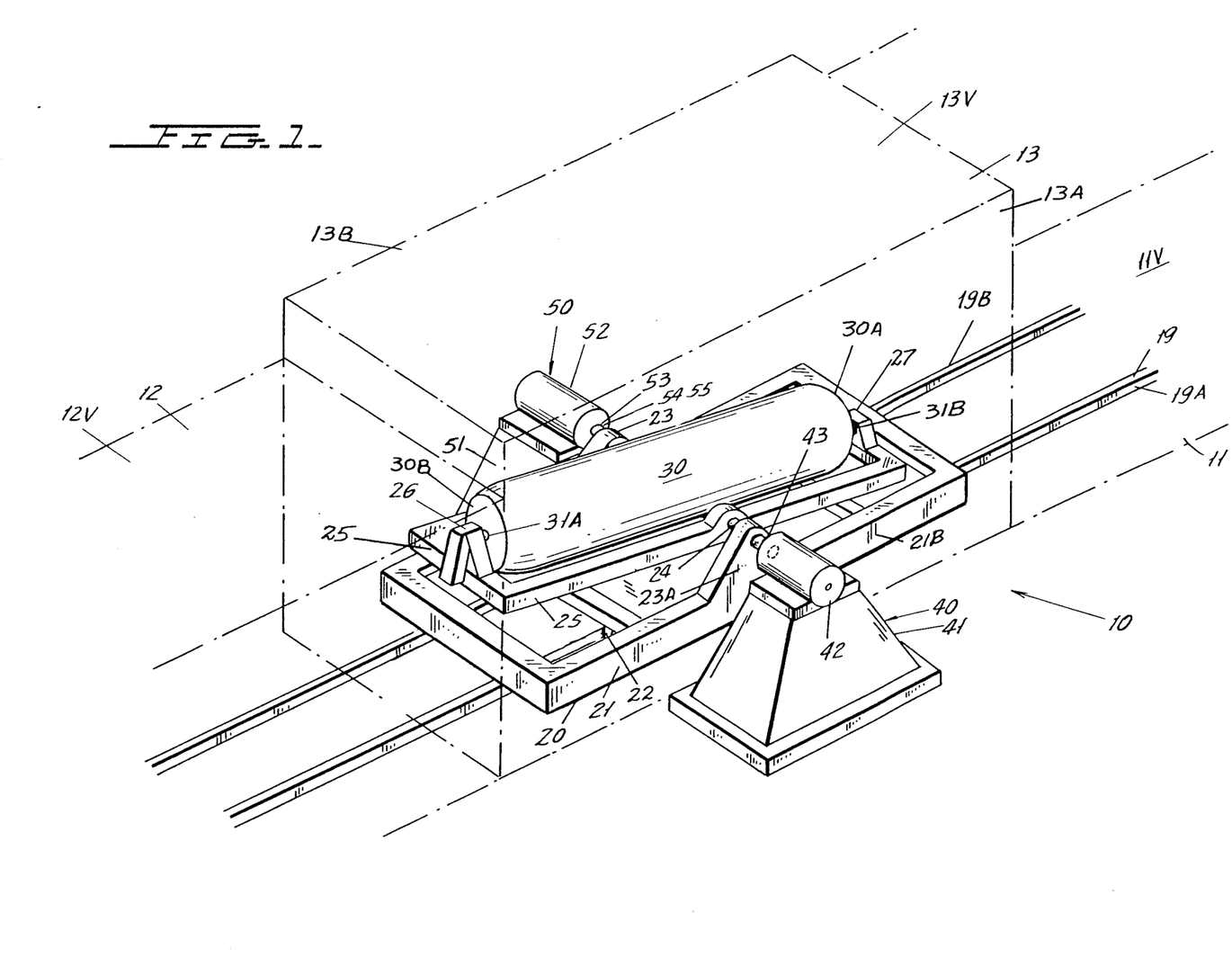
FIG. 1 is an isometric view of a portion of the rotational molding apparatus defined in this invention showing details of a mold carrying carriage supported on a track within a heating chamber and a drive means for a mold on a carriage supported adjacent the heating chamber.
Figure 1A:
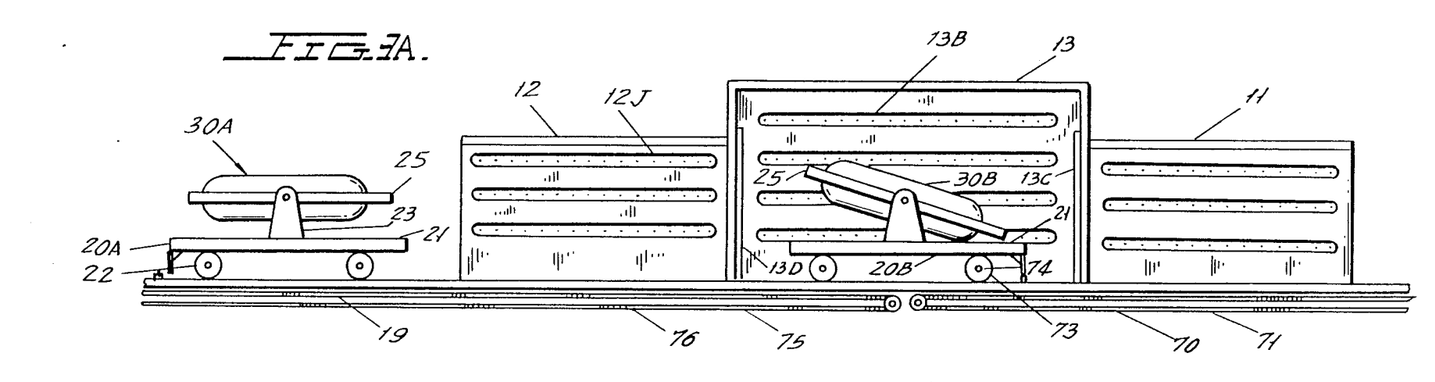
Figure 1B:
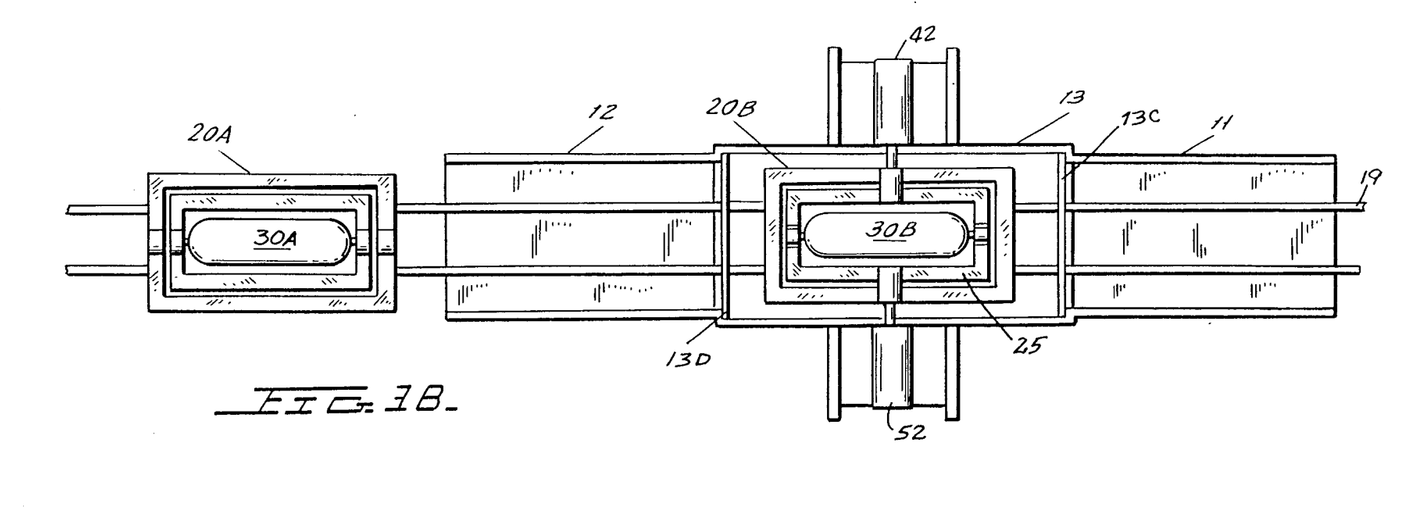

In FIG. 1 is shown a rotational molding apparatus 10 having cooling chambers 11 and 12 each connected to the opposite ends of a heating chamber or oven 11, the three being aligned with a common track 19 extending completely therethrough and beyond the cooling chambers to permit two shuttle cars or mold carriages to respectively pass into each cooling chamber from its exterior and then to the oven, back into the cooling chamber and then to the exterior thereof for removal of a molding from a mold supported by the carriage and the cleaning or reconditioning of the mold for molding. One of the mold carrying cars or vehicles 20 is shown predeterminately located within the oven interior volume 13V on the track 19, which is composed or a pair of parallel rails 19A and 19B secured to the floor of the oven, cooling chambers and factory floor. The location of the carriage or mold shuttle car 20 is such that certain coupling devices which are operated from the exterior of the oven, may be moved into the oven to engage mold car supported coupling devices for driving the mold on the car as will be described.

The illustrated mold carrying vehicle 20 comprises a base or frame 21 formed of welded hollow box beams of steel, denoted 21B, to which are secured four wheels 22 supported on axles or mountings for rotation to permit wheeled movement of the vehicle along the track. Each car or vehicle is driven by a self contained motor (not shown) or by a chain drive (not shown) secured within a duct within the floor and connected to a motor which is controlled by signals generated by sensors which sense rotations of the motor, the mvoement of the chain or limit switches engaged by fingers or other devices supported by the vehicle frame or carriage, which signals are fed to a computer or microprocessor controlling the entire molding operation. Counting the rotations of the motor driving the chain to which the mold car is connected or increments of movement of the chain itself by generating pulse signals with such rotations or movement and applying such pulse signals to uncount a predetermining counter may be utilized to precisely locate the mold car within the heating chamber 13 by utilizing such counter to pulse the stop control of such motor when the car is aligned with a pair of drive assemblies 40 and 50 located on opposite sides of the chamber 13. Drive assembly 40 contains an upwardly extending support 41 secured to the floor and/or the sidewall 13A of heating chamber 13A and supports a housing 42 which has an output shaft 43 which is movable to couple to a shaft 24 supporting a frame 25 which rotationally supports a rotational mold 30 therein. A motor supported within housing 42 causes shaft 43 to rotate in an oscillating manner to similarly oscillate shaft 24 and rock the frame 25 and its mold a predetermined degree with respect to the horizontal while the mold rotates within the frame so as to predeterminately distribute fluent plastic material throughout the mold.

Drive assembly 50 includes an upright support 51 supported outside of and adjacent the opposite side wall 13B of the oven 13 and supporting a housing 52 containing motors therein and a shaft 53 connected to such motors and operable to be coupled to a mechanism to be described for rotating the mold 30 when such shaft 53 is coupled thereto and is power rotated.

Frame 25 contains bearings or pillow blocks 26 and 27 which are centrally supported on the lateral beams of the frame, which bearings respectively rotationally support a first shaft 31A and a second shaft 31B. The ends of shafts 31A and 31B are either secured to portions of the end walls 30A and 30B of the mold 30 or to opposite ends of a shaft or tube extending completely through the mold 30 and adapted to receive and pass fluent plastic molding material or a plurality of materials from one or more exterior supplies thereof to the interior of the mold or a hollow molding supported within the mold. Thus by controlling the operation of actuators and motors within housings 42 and 52, drives for power rocking and rotating the rotational mold 30 may be coupled to the input mechanisms for such mold movements and may thereafter operate to predeterminately pivotally move and rotate the mold on its car.

Figure 2:
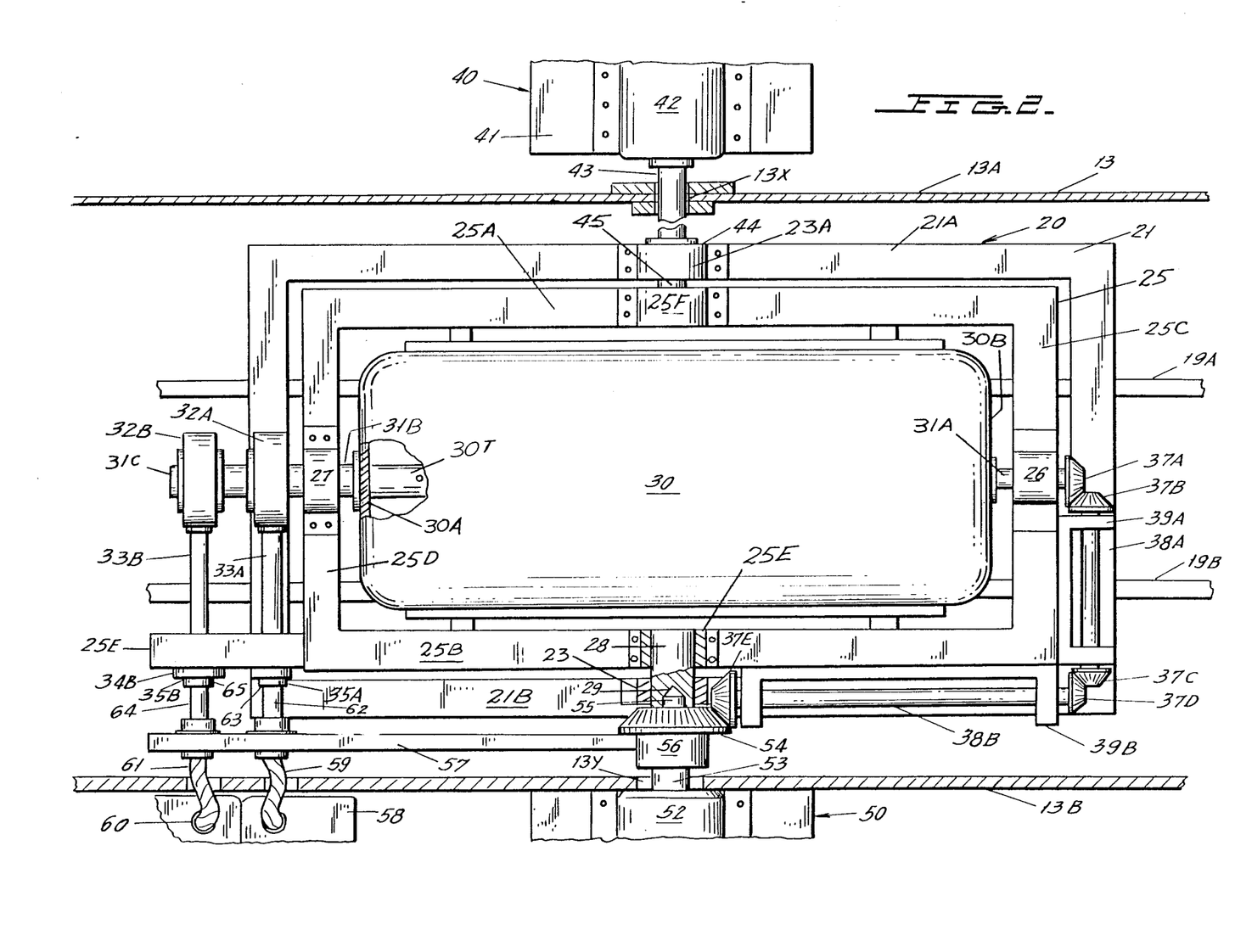
FIG. 2 is a plan view of a modified form of the mold and carriage of FIG. 1 and coupling apparatus for providing both power and plastic material for the mold on the carriage.

In FIG. 2 is shown details of a modified form of the rotational molding apparatus of FIG. 1 wherein plastic material consisting of one or more powdered or liquid polymers, may be flowed into a rotational mold prior to and/or during the process of rotationally molding a composite article in the mold. The molding carriage or dolly 20 is shown predeterminately positioned within the heating oven so as to permit the described drive means to project their respective shafts 43 and 53 from retracted positions into coupling-operable relation with respect to the coupling devices described which are operable to both effect the pivotal movement of the inner frame 25 and the rotational movement of the mold therein when the drive gear-motors in the housings 42 and 52 are operating.

Also movable into coupling relation with respective receptacles or coupling devices supported by the carriage assembly 20, are respective nozzles 62 and 64 for flowing respective fluent plastic molding materials from respective containers or reservoirs of such material. Such containers or reservoirs are disposed within respective housings 58 and 60 which are located exterior of the heating chamber or oven 13 adjacent the wall 13B thereof. Each housing 58 and 60 contains, in addition to a container for liquid or powdered plastic, a pump or blower which, when automatically operated by a master controller which controls the oven and the motors in the housings 42 and 52, causes the respective plastic polymers to be flowed or blown through respective flexible conduits 59 and 61 which extend through openings in the wall 13B of the chamber 13 to respective of the nozzles 62 and 64 which are mounted on an arm 57 supported by a collar 56 which is secured to the shaft 53. When shaft 53 is properly extended from a retracted position, the tapered ends 63 and 65 of the nozzles 62 and 64 are forcibly engaged against and effect fluid coupling with respective tapered openings 35A and 35B of a pair of female coupling devices 34A and 34B which are secured adjacent each other to a bracket 25E which is connected to and extends longitudinally from the end of the inner framer 25. Female coupling device 34A is connected to a pipe or conduit 33A extending to a first rotary coupling 32A and female coupling device 34B extends to a second rotary coupling 32B both of which couplings are connected to feed respecquantities of fluent molding materials from the reservoirs in housings 58 and 60 to different conduits or passageways extending longitudianlly through hollow shaft or pipe 31B which extends to and supports one end of the mold 30. One end 31C of hollow shaft 31B has a closure while the other end 31BE is provided with a flange and coupling device 31F for supporting mold 30 by engagement with its endwall 30A and for coupling one or more passageways thereof or conduits extending therethrough from the coupling devices 32A and 32B with respective passageways formed in a tube or pipe 30T or tubes supported therein, which pipe 30T extendings partly or completely across the mold 30 and is employed to perform either as a means for conducting one or more molding materials to the inside of the mold or such a function plus its use in internally supporting the hollow or filled body formed in the mold. By automatically controlling the amount of materials flowed through such passageways or pipes within tube 30T by means of a computer or microprocessor controlling the operation of respective motors operating respective pumps or blowers in housings 58 and 60, composite hollow or filled bodies or containers may be automatically molded which comprise a hollow shell formed of the first material flowed through one of the conduits as the mold it rotated and pivoted about the described longitudinal and lateral axes, which hollow shell becomes reinforced thereafter with a second hollow wall component made of material solidified against the inner wall thereof or is so flowed as to completely fill the interior of the outer shell when it expands and solidifies therein. The inner frame 25 is supported for pivotal rocking movement by meansof a pair of aligned short shafts 28 and 45 which are respectively secured in collar fittings 25E and 25F secured to the centers of the longitudinal beams 25A and 25B of central frame 25 and are supported in bearing by pillow blocks 23 and 28 secured to the centers of longitudinal beams 21A and 21B of the outer frame 21.

Collar 56 which is secured to the end of shaft 53 also supports a tapered spur gear 54, the teeth of which are adapted to engage and operatively mesh with the teeth of a second tapered spur gear 37E secured to one end of a shaft 38B which is supported for rotation by an elongated bracket 39B which is supported by one longitudinal member 25B of the frame 25. A third tapered spur gear 37D is secured to the other end of shaft 38B and meshes with the teeth of a fourth tapered spur gear 37C. The latter is supported for rotation about its longitudinal axis by bearings of a bracket 39A which is supported along the end of the lateral structural member 25C of frame 25 and contains a fifth spur gear 37B, the tapered teeth of which engage with the tapered teeth of a sixth spur gear 37A which is secured to the end of shaft 31A which is rotationally supported by pillow block or bearing 26. Thus as shaft 53 is power rotated by a motor in housing 52 after gear 54 has made coupling engagement with tapered spur gear 37E, powered rotary motion is transmitted through the six tapered spur gears to shaft 31A power rotating the mold about its longitudinal axis which is defined by the axis of shafts 31A and 31B.

While a gearmotor in housing 52 imparts rotary driving movement to the mold 30, a gearmotor in housing 42 operates to impart pivotal movement ot the frame 25 supporting the mold for rotation therein by driving shaft 43 in a pivoting or oscillating rotary movement. Upon predeterminatly positioning the mold carriage or vehicle 20 within the heating chamber 13, as shown in FIG. 2, shaft 43 is automatically extended by a lineal actuator or motor in housing 42 to cause a coupling device 44 secured to or defining its end to engage and mate with a recepticle coupling device or shaped end of a shaft 45 which is secured at its end to a bracket 46 supported on the longitudinal beam 25A od frame 25 and which shaft is rotatably supported in a bearing or pillow block 23 supported by adjacent longitudinal beam 21A of frame 21.

Aligned with shaft 45 and supported on the other side of frame 21 is a second short shaft 28 which is supported for rotation in a second bracket or pillow block 23A secured to the opposite longitudinal beam 21B of frame 21. A cavity or bearing 29 is provided in the end of shaft 28 for receiving, aligning and rotationally supporting an end extension 55 of shaft 53 assuring alignment of the threads of the spur gear 54 with those of spur gear 37E when shaft 53 and shaft 28 are aligned and the former is projected as described. Thus when shaft 43 is driven in oscillating movement about its longitudinal axis after coupling is made bwteen its end and shaft 45, oscillating pivotal movement is imparted to frame 25 and the rotatable mold supported thereby.

The pipe or tube 30T which extends through the mold 30 may contain a plurality of openings therein for flowing one or more molding materials as described into the interior of the mold or a shell molded or provided therein when the mold is opened. If the tube 30T is provided with one or more partitions running longitudinally along, its length, respective holes may be provided in respective portions of the wall or walls of the tube to allow the respective molding materials flowed through each chamber bordered by such partition to the interior of the mold or the shell molded therein. If separated pipes or conduits are supported within the tube 30T and extend longitudinally therethrough, each of such conduits may be provided with respective holes therein or nozzles attached thereto and extending laterally therefrom through which the respective fluent molding materials may be flowed into the mold either directly from the conduits or through openings in the tube or conduit 30T.

The tube 30T may also be provided with a passageway or separate tube extending therethrough or through the wall of the tube through which conduit or passageway a coolant fluid such as water or a refrigerant gas such as carbon dioxide may be flowed to maintain the conduit cool enough to prevent melting or setting molding material therein. Conversely, if the molding material is introduced in a hot melt condition into the tube 30T or one of its conduits, the wall of the tube 30T may be electrically heated, heated with a hot gas or by heat from the furnace to maintain proper flow of such molding material. Such heat transfer fluid may be introduced through one of the coupling devices illustrated or another such coupling device pro ided along hollow shaft 31B or shaft 31A.

Figure 3:
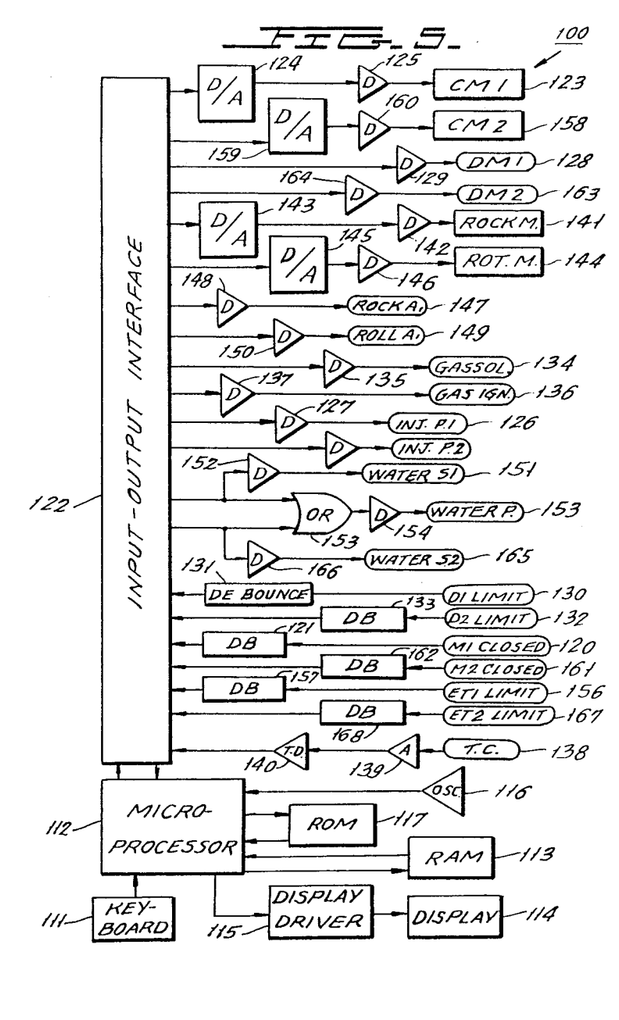
FIG. 3A is a side view of the apparatus of FIG. 1 showing two carriages on a single track, two cooling chambers and the oven wherein the chambers are oven have their sidewalls removed for clarity.
FIG. 3B is a plan view of FIG. 1 with the roofs of the cooling chamber and the oven removed for clarity.

FIGS. 3A and 3B illustrate further details of the molding apparatus of FIG. 1 and show two mold carrying vehicles or shuttle cars 20A and 20B disposed at different locations along the track 19. Car 20B is illustrated as being centered and operatively located within the heating oven 13 and contains a mold which is pivoted in an oscillating movement about a horizontal axis and rotated about the longitudinal axis of its inner frame 25 by the means provided in FIG. 1 and also illustrated in FIGS. 2 and 4. The heating oven 13 preferably contains a plurality of pipes, one of which is illustrated and is denoted 13B which extends parallel to the other pipes longitudinally through the oven around the oven 30B for providing jets of burning gas through a plurality of nozzles secured to the pipes. When a molding cycle is completed, the mold carrier 20B is power driven by means of a chain drive 70 located beneath the floor on which the oven 13 and its cooling chambers 11 and 12 are supported. One of the links of the chain 71 of the chain drive 70 contains an arm 73 extending upwardly therefrom which engages either a bracket 74 connected to one of the axles of the carriage or welded to the frame 21. Similarly, carriage assembly 20A has one of its axles or the main frame 21 thereof connected to the chain 76 of a second chain drive 75 through a fitting 77 for driving the car or carriage in both directions along track 19 depending on the direction in which its chain 76 is driven by a suitable, reversible gear motor. Chain drives 70 and 75 each are driven by separate gear motors, preferably disposed beneath the floor and each controlled by respective limit switches located beneath the floor within the oven 13 and adapted to trigger stop controls of the chain drive motors to preposition the respective mold carriages within the center of the oven so that coupling means for driving the mold and admitting molding material to the mold may be properly moved into coupling engagement with respective couplings mounted on the respective carriages when so prepositioned or centered within the oven.

Carriage 20A is shown located exterior of the cooling chamber 12, which position it is driven to and stopped by means of a suitable limit switch engaged by arm 33, after the mold 30A thereof has been properly cooled and just before the mold is opened and stripped of its molded piece or pieces.

When carriage 20A is located at its own loading location, as illustrated, beyond the cooling chamber 12, an automatic opening and stripping device, such as an industrial robot, may be automatically operated to open the mold and remove the molded article therefrom and to close and seal or lock the mold halves together thereafter. Similarly, carriage 20B is driven by chain drive 70 to the right into cooling chamber 11 and automatically centered wherein while jets of cooling water are directed against the mold 30B thereof to cool same, after which the carriage 20B is driven out of the open end of the chamber 11 for manual or automatic opening and stripping.

The cycle of operation is preferably such that, when one carriage is driven in one direction out of the heating oven 13, the other carriage, either immediately or shortly thereafter, is driven through the cooling chamber 12 and into the oven to be heated while one or more plastics are introduced into its mold are caused to form a shell, wall, coating or to fill the previously formed shell portion of the composite article.

Figure 4:
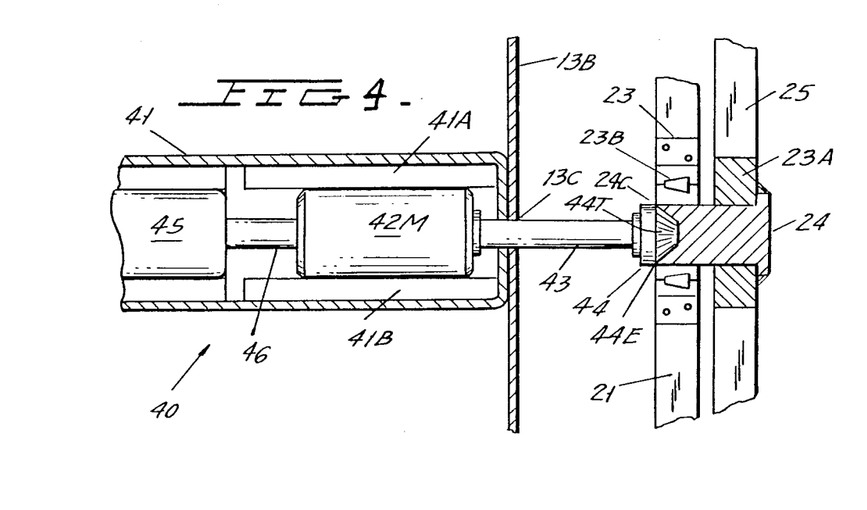
FIG. 4 is a plan view with parts broken away for clarity of a mold pivoting coupling device and drive of the type employed in the apparatus of FIG. 2.

FIG. 4 illustrates details of the mold driving unit 40 and the power operated devices contained within its housing 41. A first linear motor or actuator 45 is supported by suitable fasteners at one end of housing 41 and contains an output shaft 46 which is secured to and adapted to lineally drive a motor housing 42M. Actuator 45 is operable to controllably move its output shaft 46 longitudinally either outwardly from or back into the actuator and to thereby move and longitudinally position the gearmotor housing 42M and its output shaft 43, the end portion of which shaft extends into the interior volume 13V of the oven 13 through an opening 13K in wall 13B. Secured to the end of shaft 43 is a drive head 44 having a tapered end portion 44E containing teeth 44T which are adapted to mesh with teeth machined in the inside tapered wall of a cavity 24C formed in a heavy, hardened metal cylindrical rod 24. The rod 24 is fixedly secured to the frame 25 by being welded to a solid pillow block 23A which is bolted or welded to such frame and extends through a tapered roller bearing 23B supported within a pillow block 23 which is secured to the adjacent portion of frame 21. Thus, when the teeth of head 44 engage with the teeth formed in the cavity in the end of cylindrical rod 24, and the shaft 43 is driven in an oscillating movement as gear motor 42M operates, pivotal movement will be imparted to frame 25 through the rod 24 and the connecting block 23A. Notations 41A and 41B refer to the slide guides supported within housing 41 and engaging respective opposite portions of the exterior wall of the housing 42M containing the gear motor to support same in its longitudinal movement through the housing 41.

Figure 5:
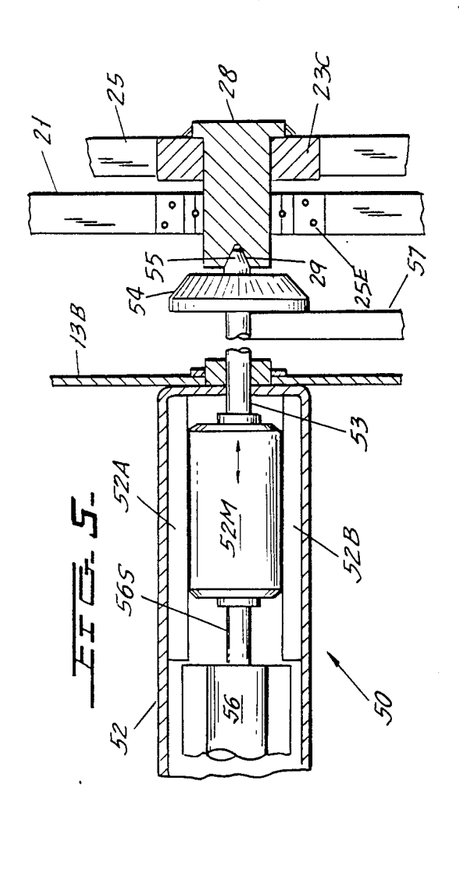
FIG. 5 is a plan view with parts broken away for clarity of a mold coupling device and drive of the type employed in the apparatus of FIG. 2 for rotating the mold of a carriage disposed aligned therewith.

In FIG. 5, the assembly 50 which is located on the opposite side of the oven, contains a lineal actuator 56 fixedly supported at the far end of the housing 52 and having an output shaft 56S connected to the rear wall of a rotary gear motor 52M which slides back and forth as driven by the lineal motor 56 so that the output shaft 53 of motor 52M may engage the end of shaft or pin 28 as described and become centered therewith when the tapered end 55 thereof engages the tapered wall of the cavity 28T formed in the end of shaft 28.

Shaft 28 is fixedly supported on the inner frame 25 by means of a bracket or pillow block 23B to which it is welded or pinned and extends through a tapered roller bearing 21B which is secured to frame 21 as described. Slide bearings or guides 52A and 52B 52B are secured within housing 52 to guide motor housing 52M in its longitudinal movement through housing 52 as driven by the shaft 56S of lineal actuator or motor 56.

In FIG. 6 is shown a schematic diagram illustrating electronic circuitry for controlling automatic, composite rotational molding machinery of the type described. The control system 100 employs means for manually or otherwise entering such process and machine variables as the movement of the molds and their respective carriages, both as to position and degree. In one form, such information may be entered by means of a digitally encoded keyboard 111, wherein when the output thereof, which comprises coded electrical signals, is applied to a microelectronic processor 112 which enters such variables in a programmable memory, such as a random access memory or RAM 113 for later use in effecting one or more automatic cycles of control. The parameters so entered, may be displayed on a visual display monitor 414 in such as a cathode ray tube monitor or other form of video monitor which is driven by a display driver 115 which receives signals generated or gated by the microprocessor 112. System synchronization and microprocessor timing are accomplished by means of signals output by a stable accurate oscillator 116 such as a crystal controlled oscillator or the like. Preprogrammed operational instructions for system 100 are contained in a non-volatile memory 117 such as a read-only memory or ROM. Instruction signals so derived are in the form of a number of different programs for controlling the molding operation to produce a number of different rotational moldings in accordance with the selective operation of the keyboard 111 which selectively reproduces such programs from the read-only memory 117.

To enhance the flexibility of system 100, specific instructions relating to portions of the program or the signals required to effect the entire operation of a molding process relating to a specific product, may be generated by the proper operation of the keys of the keyboard 111 and stored in RAM 113. Such instructions may be thereafter reproduced and utilized by the microprocessor 112 in lieu of or supplemental to the operational instructions contained in the ROM 117.

A typical mode of operation with respect to the molds supported by the two shuttled cars or carriages described, initially assumes that both molds are empty and closed. Microprocessor 112 pulls a safety limit switch 120 for one of the molds through a debounce circuit 121 and an input-output interface 122 receives a signal therefrom which is indicative that the mold is closed and ready for operation. The drive motor 123 for one of the carriages is then controlled to start by a signal from the microprocessor to drive its carriage through the cooling chamber for the carriage to the oven, such control signal being passed through the combination debounce circuit and input-output interface circuit which is denoted PIA 122 which is connected to a first digital-analog converter 124, the output of which is connected to the motor driver 125. Motor 123 is speed and directional controlled in accordance with the magnitude and sign of the buyte or buytes passed to the digital-to-analog converter 124 from the microprocessor 112 which thereafter signals a first plastic injunction pump motor 126 to predeterminately operate its pump in a manner to predeterminately charge the first mold through PIA 122 and a driver circuit 127 for such pump. The first carriage moves through the cooling chamber thereafter into the furnace while the furnace door is in an open condition, it being assumed that the door at the other end of the furnace is initially in a closed condition. When the microprocessor 112 determines that the carriage containing the first mold is at a predetermined location in the furnace, as determined by signals generated in accordance with the speed of the motor 123 and the elapsed operation of time thereof, said microprocessor generates and transmits signals to a stop control for motor 123 through PIA 122, digital-analog converter 124 and driver 125. The microprocessor is also operable to effect a closure of the open door to the furnace through which the first carriage has passed, by generating and transmitting a control signal to the door motor 128 through PIA 122 and the motor driver 129. The microprocessor 122 then polls a limit switch 130 which is closed or activated when the first door is closed through a debounce circuit 131 and PIA 122. After switch 130 is closed, microprocessor 112 checks a second limit switch 132 through a debounce circuit 133 and PIA 122 to insure that the second door is also closed. If both doors are closed, mircoprocessor 122 then generates a control signal for operating a solenoid of a solenoid valve 134 through PIA 122 and a solenoid driver 135 and also generates a control which it passes to a gas igniter such as a high voltage spark generator 136, again employing PIA 122 and a driver 137. A short time after the gas in the furnace has been ignited, microprocessor 112 polls a temperature gauge 138, such as a thermocouple, which has been located in the path of the flame generated by the burner or nozzle in the furnace to insure that ignition has taken place. To effect such determination, the output of a thermocouple 138 is amplified by a DC amplifier 139, the output of which is compared to a reference voltage by a threshhold detector 140. When the reference voltage is exceeded, detector 140 generates a signal to indicate such condition to the microprocessor 112 through PIA 122. If ignition has not been achieved, microprocessor 112 may shut down the entire system 100 such as by turning off the gas supply, injection pumps, drive motors and the like may thereafter signal the operator of the system 100 to display 114, indicating such malfunction.

Assuming that the two furnace doors are closed and the heat source is ignited, microprocessor 112 then initiates and controls a first mold pivotting motor 141 through PIA 122, digital-to-analog convertor 143 and its motor driver 142. The speed and direction of motor 141 are controlled by the magnitude and sign of the buytes transferred to a digital-to-analog convertor 143. Simultaneously with such control function, microprocessor 112 activates the mold rotating motor 144 through PIA 122, digital-analog convertor 145 and a motor driver 146. Rotational speed is also controlled by the magnitude of the buyte so transferred to the digital-to-analog convertor 145. Motor 141, which serves to effect the mold rocking movement, is engaged with the mold carriage by a rocking actuator or motor 147 by means of signals generated by microprocessor 112 and passes through PIA 122 and an actuator driver 148. Mold rotating motor 144 is operable to become coupled to the input to the drive for the mold holding frame by the operation of a mold rotation actuator 149 by means of signals generated and an output of the microprocessor 112 and passed to an actuator driver 150 through PIA 122.

When sufficient heat has been added to the mold, as determined by the amount of time it is disposed within the furnace and other process variables, microprocessor 112 deactivates gas solenoid 134, gas igniter 136, rock actuator 147, rock motor 141, rotation actuator 149 and rotation motor 144, via appropriate drive circuits and PIA 122. Microprocessor 122 then signals furnace door motor 128 to operate and open the furnace door. Thereafter, the carriage drive motor 123 operates to drive the first carriage in reverse. When the hot mold has been driven into the cooling chamber, the microprocessor 112 provides signals to close the furnace door by operating the door drive motor 128 and to stop the movement of the carriage drive motor 123. Microprocessor 112 then signals a water shutoff valve solenoid 151 to open, through PIA 122 and a solenoid driver 152 and also activates motor 153 of cooling water pump. The signals so generated pass through an OR gate 155 and a pump motor driver 154. The mold is thus cooled for a predetermined period of time in its cooling chamber.

When a cooling cycle is completed, microprocessor 112 shuts off a water control valve solenoid 151 and stops the operation of the water pump 153. Simultaneously, such microprocessor activates the carriage drive motor 123 to drive the carriage in the reverse direction until it engages an end-of-travel limit switch 156. A signal indicative of such end-of-travel condition is then transmitted from switch 156 through a debounce circuit 157, PIA 122 and is thereafter transmitted to microprocessor 112 and utilized to reinitiate the molding process. Such reinitiation involves the provision of signals which are passed to a stop carriage motor 123. Such signals also begin polling the closure switch 120 for the mold of the first carrier which, when the mold is opened to permit the removal of a molded article or articles therefrom, generates a signal for initiating the control of an automatic removal device such as an industrial manipulator for effecting the removal of the molded article or articles therefrom.

Similarly, and appropriately controlled in time by signals from the microprocessor 112, the other carriage 158 containing the other mold or array of molds is automatically operated by means of programmed signals gated from the microprocessor memory through PIA 122, then to a digital-to-analog converter 159 which controls a motor driver 160 for carriage motor 158. The automatic control cycle for the motors associated with the second carriage for operating the carriage, molds, cooling chamber pump motor, gas solenoid for the furnace, furnace igniter, furnace doors, etc. is similar to that described above for controlling the modling cycle for the mold or molds supported by the first carriage and will therefor not be further described or detailed with the exception that the following components are provided:

Notation 161 refers to the mold closure limit switch for the mold or molds supported by the second carriage. Its debounce circuit is denoted 162. Notation 163 refers to the motor operating the mechanism for opening and closing the furnace door past which the second mold carriage travels to enter and exit from the furnace. Such motor has an attendant motor driver 164. A solenoid valve 165 is employed to open and close a supply or inlet for cooling water to the cooling chamber and it is controlled by a solenoid driver 166. Notation 167 refers to an end-of-travel limit switch with an attendant debounce circuit 168 for controlling the stoppage of the second carriage within the furnace at an operating location therein.

Synchronization of the stop locations of the two carriages is provided by properly programming the microprocessor 112 and may be accomplished by providing suitable step-time delays in such control cycles to prevent the carriages from colliding or interfering with each other within the heating chamber or furnace.

It is also assumed that suitable power supplies are provided in system 100 for providing electrical energy for effecting the operation thereof as described and are correctly connected to all of the active electrical and electronic components to effect the proper operation of the system.

I claim:

1. Rotational molding apparatus comprising in combination:
   (a) an oven having parallel side walls,
   (b) a shuttle mold assembly including a movable first support,
   (c) first motor operated drive means for moving said first support into and out of said oven,
   (d) said mold assembly including a rotational mold and a mold support supported for pivotal movement about a plurality of axes on said first support,
   (e) second motor operated drive means supported fixed with respect to said oven and operable for pivotally driving a mold which is supported on said first support,
   (f) coupling means associated with said second motor operated drive means and said first support for coupling and uncoupling said second drive means with respect to said first mold support to permit said second drive means to drive said mold in pivotal movement on said first support while disposed thereby in said oven,
   (g) means for predeterminately locating said first support in said oven, and
   (h) power operated means for driving said coupling means in a manner to effect driving coupling between said second drive means and said mold support when said shuttle mold assembly is predeterminately located on said first support in said oven to permit said second motor operated drive means to rotate said rotational mold within said oven.

2. Rotational molding apparatus in accordance with claim 1 including first and second means for pivotally supporting said mold for rotation about first and second axes, drive means for respectively driving said mold on said first support about said first and second axes, first and second motors, first and second drive coupling means connected to said first and second motors and first and second receiving coupling means connected to said first and second means pivotally supporting said mold for respectively receiving said first and second drive coupling means when said first support is predeterminately located within said oven so as to permit said first and second motors to drive said mold on said first support about said first and second axes.

3. Molding apparatus in accordance with claim 1 including a second support in the form of a rigid frame and means for pivotally supporting said frame on said first support, means for pivotally supporting said mold on said frame to permit it to be rotated within said frame, said motor operated drive means including a first motor for power rotating said mold within said frame and a second motor supported adjacent said oven for power rotating said frame on said first support.

4. Molding apparatus in accordance with claim 3 wherein said first motor is supported adjacent said oven and said coupling means is operable to respectively couple said first motor to permit it to drive said rigid mold frame and said second motor to permit it to pivotally drive said mold within said mold frame when said first support is predeterminately located within said oven.

5. Molding apparatus in accordance with claim 4 wherein said drive means includes a chain of drive shafts and gear means extending partly around said frame, a shaft supporting said mold for rotation within said frame and gear means connecting said mold shaft and one end of said chain of shafts, and a coupling member connected to the other end of said chain of shafts.

6. Molding apparatus in accordance with claim 5 wherein said first and second motor are supported exterior of said oven.

7. Molding apparatus in accordance with claim 5 including first and second pairs of coupling means for respectively connecting said first and second motors to said shaft supporting said mold and said frame.

8. Molding apparatus comprising in combination:
   (a) an oven,
   (b) a first mold support,
   (c) a mold rotationally supported on said first mold support,
   (d) first motor operated drive means for driving said mold on said first mold support,
   (e) guide means for guiding said mold support along a fixed path into and out of said oven,
   (f) locating means for predeterminately positioning said mold support in said oven,
   (g) second motor operated means for powering said first drive means,
   (h) first coupling means supported by said first mold support and connected to rotate said mold,
   (i) second coupling means connected to said second motor operated means,
   (j) means operable when said mold is predeterminately located in said oven for connecting said first and second coupling means together,
   (k) means for operating said second motor operated to cause it to transmit power through said first and second coupling means to said first drive means for said mold while said mold is in said oven so as to power rotate said mold on said mold support.

9. Molding apparatus in accordance with claim 8 including a second mold support and a second mold rotationally supported on said second mold support, means for guiding and driving said second mold support into and out of said oven and means for predeterminately locating said second mold support in said oven.

10. Molding appratus in accordance with claim 9 including drive means for driving said second mold on said second mold support and means for coupling said first motor means to said drive means for said second mold to permit said first motor means to drive said second mold in rotation on said second mold support while said second mold support is predeterminately located in said oven.

11. Molding apparatus in accordance with claim 8 including first and second cooling chambers located at opposite ends of said oven and a trackway extending from beyond said cooling chambers through said cooling chambers and said oven, a second mold support and a second mold supported thereby, drive means for said second mold support for driving same along said track, said first and second mold supports adapted to travel said trackway and means for controlling the driving movement of said first and second mold supports along said trackway to alternately predeterminately dispose each in said oven and to drive each mold support after it has remained in said oven a predetermined time interval out of said oven into one of said cooling chambers.

12. Molding apparatus in accordance with claim 11 including first and second cooling chambers located at opposite ends of said oven and means located in said first and second cooling chambers for flowing and applying a coolant liquid against molds when located within said first and second cooling chambers, and a master control means operable to control said drive means and said coupling means when a mold support and its mold are predeterminately located within said oven to effect the powered driving of the mold in the oven on its mold support whereby said first and second mold support may be alternately driven into said oven, removed therefrom and disposed in a respective cooling chamber while the mold is cooled therein and thereafter removed from the cooling chamber to permit the molding to be removed from the mold.

13. Molding apparatus in accordance with claim 1 including master control means operable to cyclically control said means for moving said first support into and out of said oven, said means for driving said coupling means and said motor operated drive means for driving said mold supported by said support in rotation on said support when said first support is predeterminately located within said oven.

14. Rotational molding appratus comprising in combination:
(a) an oven,
(b) a shuttle mold assembly including a movable first support,
(c) first motor operated means for moving said first support into and out of said oven,
(d) said mold assembly including a rotational mold, means for supporting said rotational mold for pivotal movement about a plurality of axes on said first support,
(e) second motor operated drive means supported fixed with respect to said oven for driving a mold supported by said first support in multi-axis rotation on said first support,
(f) coupling means for connecting said second motor operated drive means and said mold while in said oven to permit said second drive means to drive said mold in pivotal movement on said first support,
(g) means for predeterminately positioning said first support with a mold supported thereby in said oven, and
(h) third motor operated means for driving said coupling means when said first support is predeterminately located in said oven with a mold supported thereon so as to cause said coupling means to connect said second drive means to a mold on said first support to permit said second drive means to drive said mold within said oven.

15. Molding apparatus in accordance with claim 14 including means for power operating said coupling means to cause it to uncouple said second drive means from said mold to permit said shuttle mold assembly to be removed from said oven by the movement of said movable first support out of said oven.

* * * * *